(12) United States Patent
Kodemura et al.

(10) Patent No.: US 11,958,969 B2
(45) Date of Patent: Apr. 16, 2024

(54) STYRENE-BASED BLOCK COPOLYMER LATEX

(71) Applicant: ZEON CORPORATION, Tokyo (JP)

(72) Inventors: Junji Kodemura, Tokyo (JP); Yoshitaka Satoh, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 354 days.

(21) Appl. No.: 17/271,273

(22) PCT Filed: Aug. 15, 2019

(86) PCT No.: PCT/JP2019/032022
§ 371 (c)(1),
(2) Date: Feb. 25, 2021

(87) PCT Pub. No.: WO2020/045102
PCT Pub. Date: Mar. 5, 2020

(65) Prior Publication Data
US 2021/0388199 A1    Dec. 16, 2021

(30) Foreign Application Priority Data

Aug. 27, 2018 (JP) ................. 2018-158076

(51) Int. Cl.
| | | |
|---|---|---|
| *C08L 53/02* | (2006.01) | |
| *B29C 41/00* | (2006.01) | |
| *B29C 41/14* | (2006.01) | |
| *B29L 31/00* | (2006.01) | |
| *C08F 236/08* | (2006.01) | |
| *C08J 5/18* | (2006.01) | |
| *C08K 5/14* | (2006.01) | |
| *C09J 153/02* | (2006.01) | |

(52) U.S. Cl.
CPC ............ *C08L 53/02* (2013.01); *B29C 41/003* (2013.01); *B29C 41/14* (2013.01); *C08F 236/08* (2013.01); *C08J 5/18* (2013.01); *C08K 5/14* (2013.01); *C09J 153/02* (2013.01); *B29L 2031/712* (2013.01); *C08L 2201/52* (2013.01); *C08L 2203/16* (2013.01)

(58) Field of Classification Search
CPC ............... C08J 2309/08; C08F 2810/20; C09J 153/025; C09J 153/02
See application file for complete search history.

(56) References Cited

U.S. PATENT DOCUMENTS

| | | | |
|---|---|---|---|
| 3,215,649 A | 11/1965 | Preiss et al. | |
| 4,251,409 A | 2/1981 | Neubert | |
| 4,285,850 A | 8/1981 | Neubert | |
| 4,289,683 A | 9/1981 | Neubert | |
| 4,300,972 A | 11/1981 | Neubert | |
| 5,082,895 A * | 1/1992 | Wolff | C09D 133/064 524/823 |
| 2003/0055010 A1 * | 3/2003 | De Haan | A23B 4/22 514/450 |
| 2007/0082152 A1 | 4/2007 | Kodama | |
| 2010/0204397 A1 | 8/2010 | Kobayashi et al. | |
| 2014/0171540 A1 | 6/2014 | De Jong | |
| 2019/0010271 A1 | 1/2019 | Kodemura et al. | |
| 2019/0031788 A1 | 1/2019 | Kodemura et al. | |
| 2019/0300685 A1 | 10/2019 | Ishiba et al. | |
| 2021/0135225 A1 * | 5/2021 | Yamamoto | H01M 50/461 |

FOREIGN PATENT DOCUMENTS

| | | | |
|---|---|---|---|
| JP | S55-142635 A | | 11/1980 |
| JP | S63-243119 A | | 10/1988 |
| KR | 960000854 | * | 1/1996 |
| WO | 2005/049725 A1 | | 6/2005 |
| WO | 2017/130889 A1 | | 8/2017 |
| WO | 2017/159534 A1 | | 9/2017 |
| WO | 2018/061867 A1 | | 4/2018 |
| WO | WO 201907229 | * | 6/2019 |

OTHER PUBLICATIONS

Kim et al., electronic translation of KR 960000854, Jan. 1996.*
Pergan, The Peroxide Company, Crosslinking of rubbers and polyolefines with Organic Peroxides, Technical Bulletin, Rev. CL/01/092016, 2016, Germany, 9 pages, found online at https://www.pergan.com/files/downloads/Crosslinking_of_rubbers_and_polyolefines.pdf.
Dec. 14, 2022 European Third Party Observation issued in European Patent Application No. 19855209.3.
Mar. 2, 2021 International Preliminary Report on Patentability issued in International Patent Application No. PCT/JP2019/032022.
Oct. 29, 2019 International Search Report issued in International Patent Application No. PCT/JP2019/032022.
Sep. 15, 2022 Official Action Issued in Brazilian Patent Application No. BR112021003433-1.
Chapter 13, Polymer Lactices, 1997, pp. 492-497, vol. 2.
May 4, 2022 Search Report issued in European Patent Application No. 19855209.3.
May 22, 2023 Third Party Observation issued in European Patent Application No. 19855209.3.
Jul. 5, 2023 Office Action issued in European Patent Application No. 19855209.3.
Nov. 13, 2023 Office Action issued in European Patent Application No. 19855209.3.
Sep. 11, 2023 Office Action issued in Brazilian Patent Application No. BR112021003433-1.
Feb. 8, 2023 Office Action issued in European Patent Application No. 19855209.3.
Feb. 9, 2024 Third Party Observation issued in European Patent Application No. 19855209.3.

* cited by examiner

*Primary Examiner* — Jeffrey C Mullis
(74) *Attorney, Agent, or Firm* — Oliff PLC

(57) ABSTRACT

A latex of a styrene-based block copolymer includes a styrene-based block copolymer and water. The styrene-based block copolymer includes a toluene insoluble content of 30 to 95 wt %. The latex of the styrene-based block copolymer is superior in the processability and can provide a molded film such as a dip-molded product having the high tear strength, the high stress retention and the soft texture.

10 Claims, No Drawings

STYRENE-BASED BLOCK COPOLYMER LATEX

TECHNICAL FIELD

The present invention relates to a latex of a styrene-based block copolymer that is superior in processability and can provide a molded film such as a dip-molded product having the high tear strength, the high stress retention and the soft texture. Further, the present invention relates to a molded film, a packaging structure and a substrate with an adhesive layer using such a latex of a styrene-based block copolymer.

BACKGROUND ART

Conventionally, it has been known to form a latex composition containing a latex of a natural rubber into a film to obtain a molded film. The molded film includes, for example, a dip-molded product that is used in contact with a human body such as a nipple, a balloon, a glove, a balloon, a sack, and the like. The dip-molded product is obtained by dip-molding the latex composition containing the latex of the natural rubber. However, the latex of the natural rubber contains proteins that cause allergic symptoms to the human body. Therefore, there have been cases in which issues arise when using the latex of the natural rubber for a dip-molded product in direct contact with a mucous membrane of a living body or internal organs. Therefore, it has been studied to use a latex of a synthetic rubber in place of the latex of the natural rubber.

For example, Patent Document 1 discloses a latex composition obtained by adding an aqueous solution of an aluminum compound to a latex of a synthetic polyisoprene containing a carboxyl group and/or a latex of a styrene-isoprene-styrene block copolymer containing a carboxyl group. However, when the latex disclosed in the Patent Document 1 is used, there has been a problem that moldability when film molding such as dip molding is performed is not sufficient. Further, there has been a problem that a molded product obtained when the latex described in the Patent Document 1 is used is inferior to uniformity of film thickness.

RELATED ART DOCUMENTS

Patent Documents

Patent Document 1: International Publication No. WO 2017/130889

SUMMARY OF THE INVENTION

Problem to be Solved by the Invention

The present invention has been made in consideration of such circumstances. An object according to the present invention is to provide a latex of a styrene-based block copolymer that is superior in the processability and can provide a molded film such as a dip-molded product having the high tear strength, the high stress retention and the soft texture.

Means for Solving the Problem

The present inventors have intensively studied to solve the above problem. As a result, it has been found that the above problem can be solved by a latex of a styrene-based block copolymer in which a toluene insoluble content is controlled to a specified range. The present inventors have completed the present invention on a basis of such findings.

According to the present invention, there is provided a latex of a styrene-based block copolymer comprising a styrene-based block copolymer and water, the styrene-based block copolymer comprising a toluene insoluble content of 30 to 95 wt %.

In the latex of the styrene-based block copolymer according the present invention, the styrene-based block copolymer is preferably a styrene-based block copolymer represented by the following general formula (1),

in the general formula (1), each of A is independently a polymer block containing 90 wt % or more of a unit derived from an alkenyl aromatic hydrocarbon; Y is a single bond or a residue of a coupling agent having functionality; each of B is independently a polymer block containing 90 wt % or more of a unit derived from a conjugated diene; and "n" is 0 to 5.

In the latex of the styrene-based block copolymer according to the present invention, the styrene-based block copolymer is preferably a styrene-isoprene block copolymer.

In the latex of the styrene-based block copolymer according to the present invention, the viscosity at 25° C. is preferably 10 to 300 cps when a solid content concentration is set to 55 wt %.

According to the present invention, there is provided a molded film comprising the latex of the styrene-based block copolymer.

Further, according to the present invention, there is provided a packaging structure capable of accommodating an object between a first sheet substrate and a second sheet substrate, wherein at least a part of the first sheet substrate and at least a part of the second sheet substrate are bonded and laminated by a film comprising the latex of the styrene-based block copolymer.

Furthermore, according to the present invention, there is provided a substrate with an adhesive layer, the adhesive layer being famed on a surface of the substrate, and the adhesive layer comprising the latex of the styrene-based block copolymer.

According to the present invention, there is provided a method for producing the latex of the styrene-based block copolymer comprising:
adding a radical polymerization initiator to a latex of a styrene-based block copolymer prior to cross-linking as a raw material; and
cross-linking the styrene-based block copolymer prior to cross-linking as a raw material in the form of the latex to form a toluene insoluble component.

In the method for producing the latex of the styrene-based block copolymer according to the present invention, the radical polymerization initiator is preferably a peroxide polymerization initiator.

In the method for producing the latex of the styrene-based block copolymer according to the present invention, an activator is preferably added in addition to the radical polymerization initiator to proceed the cross-linking reaction.

According to the present invention, there is provided a method for producing a dip-molded product, comprising:
obtaining the latex of the styrene-based block copolymer by the method above; and
dip-molding the obtained latex of the styrene-based block copolymer.

Effects of Invention

According to the present invention, it is possible to provide the latex of the styrene-based block copolymer that is superior in the processability and can provide the molded film such as the dip-molded product having the high tear strength, the high stress retention and the soft texture. Further, according to the present invention, it is possible to provide the molded film, the packaging structure and the substrate with the adhesive layer using such a latex of a styrene-based block copolymer.

DESCRIPTION OF EMBODIMENTS

<Latex of Styrene-Based Block Copolymer>

The latex of a styrene-based block copolymer according to the present invention comprises the styrene-based block copolymer and water, the styrene-based block copolymer comprising the toluene insoluble content of 30 to 95 wt %.

The latex of the styrene-based block copolymer according to the present invention comprises a styrene-based block copolymer and water. The toluene insoluble content of the styrene-based block copolymer is in the range of 30 to 95 wt %. The latex of the styrene-based block copolymer according to the present invention can be produced, for example, by cross-linking a latex of a styrene-based block copolymer prior to cross-linking as a raw material. Hereinafter, the latex of the styrene-based block copolymer prior to cross-linking as a raw material is appropriately referred to as "a latex of pre-cross-linking styrene-based block copolymer".

The latex of pre-cross-linking styrene-based copolymer comprises a pre-cross-linking styrene-based block copolymer and water.

The pre-cross-linking styrene-based block copolymer may be any block copolymer containing at least a polymer block containing a styrene unit as a main component (for example, a polymer block in which a content of a styrene unit is 50 wt % or more). Examples of the pre-cross-linking styrene-based block copolymer include a copolymer of a polymer block containing a styrene unit as a main component and a polymer block containing a monomer unit other than the styrene unit as a main component.

In the present invention, the pre-cross-linking styrene-based block copolymer is, for example, a block copolymer represented by the following general formula (1).

$$A\text{-}B\text{—}Y\text{—}(B\text{-}A)_n \qquad (1)$$

(In the general formula (1), each of A is independently a polymer block containing 90 wt % or more of a unit derived from an alkenyl aromatic hydrocarbon; Y is a single bond or a residue of a coupling agent having functionality; each of B is independently a polymer block containing 90 wt % or more of a unit derived from a conjugated diene; and "n" is 0 to 5.)

In the general formula (1), each of A is independently the polymer block containing 90 wt % or more of the unit derived from the alkenyl aromatic hydrocarbon. The ratio containing the unit derived from the alkenyl aromatic hydrocarbons is preferably 95 wt % or more, more preferably 98 wt % or more, and particularly preferably substantially 100 wt %.

The alkenyl aromatic hydrocarbon is not particularly limited. Examples of the alkenyl aromatic hydrocarbon include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, vinylnaphthalene, and the like. Among these, styrene is preferred. These alkenyl aromatic hydrocarbons may be used one type alone or in combination of two or more types.

In the general formula (1) above, the polymer block represented by the A may contain another monomer unit other than the unit derived from the alkenyl aromatic hydrocarbon. Examples of the monomer constituting such another monomer unit include conjugated diene monomers such as 1,3-butadiene, isoprene, 2,3-dimethyl-1,3-butadiene, and 1,3-pentadiene, α,β-unsaturated nitrile monomers, unsaturated carboxylic acids or acid anhydride monomers, unsaturated carboxylic acid ester monomers, non-conjugated diene monomers, and the like.

In addition, in the general formula (1) above, each of B is independently the polymer block containing 90 wt % or more of the unit derived from a conjugated diene. The ratio containing the unit derived from the conjugated diene is preferably 95 wt % or more, more preferably 98 wt % or more, and particularly preferably substantially 100 wt %.

The conjugated diene is not particularly limited. Examples of the conjugated diene include 1,3-butadiene, isoprene, 2,3-dimethyl-1,3-butadiene, 2-chloro-1,3-butadiene, 1,3-pentadiene, 1,3-hexadiene, myrcene, farnesene, and the like. Among these, 1,3-butadiene and/or isoprene are preferred, and isoprene is particularly preferred. These conjugated dienes may be used one type alone or in combination of two or more types. Further, a hydrogenation reaction may be pertained to a portion of an unsaturated bond of the unit derived from the conjugated diene.

In the general formula (1), the polymer block represented by the B may contain another monomer unit other than the unit derived from the conjugated diene. Examples of the monomer constituting such another monomer unit include alkenyl aromatic hydrocarbons such as styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, and vinylnaphthalene, α,β-unsaturated nitrile monomers, unsaturated carboxylic acids or acid anhydride monomers, unsaturated carboxylic acid ester monomers, non-conjugated diene monomers, and the like.

In addition, in the general formula (1), the Y is a single bond or the residue of the coupling agent having functionality. As the residue of the coupling agent having the functionality, any residue of a coupling agent having n+1 valent may be used. The residue of the coupling agent is not particularly limited, and examples thereof include residues of various coupling agents described later.

In the general formula (1), "n" is 0 to 5, and is preferable 1 to 3. When the pre-cross-linking styrene-based block copolymer is a mixture of a plurality of copolymers having different values of n, an average value of the values of n of the plurality of copolymers may be within this range.

As the pre-cross-linking styrene-based block copolymer according to the present invention, the copolymer represented by the general formula (1) can be used. From the viewpoint of further enhancing the effect according to the present invention, a styrene-isoprene block copolymer that is a block copolymer comprising a styrene polymer block and an isoprene polymer block can be suitably used. The styrene-isoprene block copolymer may be any block copolymer comprising the styrene polymer block and the isoprene polymer block. Examples of the styrene-isoprene block copolymer include styrene-isoprene diblock copolymer, styrene-isoprene-styrene triblock copolymer, isoprene-styrene-isoprene triblock copolymer, styrene-isoprene-styrene-isoprene tetrablock copolymer, and the like. From the viewpoint of obtaining an molded film such a dip-molded product superior in the high tear strength, the high stress retention, and the texture, a block copolymer containing a styrene-isoprene-styrene triblock copolymer represented by a general formula of Ar-D-Ar as a main component is suitably used. Ar is a styrene polymer block. D is an isoprene polymer block. For example, a block copolymer containing the styrene-isoprene-styrene triblock copolymer as a main component, and in addition, containing the styrene-isoprene diblock copolymer and a branched copolymer represented by a general formula of Ar-D-Y-(D-Ar)$_n$ is suitably used. In the general formula, Ar is a styrene polymer block; D is an isoprene polymer block; Y is the residue of the coupling agent; and n is 2 to 5.

The weight average molecular weight of the pre-cross-linking styrene-based block copolymer is preferably from 10,000 to 1,000,000, more preferably from 50,000 to 500,000, and still more preferably from 100,000 to 300,000 in terms of polystyrene standards by gel permeation chromatography. By setting the weight average molecular weight of the pre-cross-linking styrene-based block copolymer within the above range, a balance between the tear and tensile strength and the flexibility of the obtained molded film such as the dip-molded product is improved. Along with this, the latex of the pre-cross-linking styrene-based block copolymer tends to be readily produced.

In addition, when the pre-cross-linking styrene-based block copolymer is the styrene-isoprene block copolymer, the styrene polymer block constituting the styrene-isoprene block copolymer may be any polymer block having a styrene unit as a main constituent unit, and may contain a monomer unit other than the styrene unit. Examples of such a monomer other than styrene include alkyl-substituted styrenes such as α-methylstyrene, o-methylstyrene, m-methylstyrene, p-methylstyrene, 2,4-dimethylstyrene, ethylstyrene, p-tert-butylstyrene; halogen-substituted styrenes such as 4-chlorostyrene, 2-bromostyrene, and 3,5-difluorostyrene; alkoxy-substituted styrenes such as 4-methoxystyrene, and 3,5-dimethoxystyrene; conjugated diene monomers such as 1,3-butadiene, isoprene, 2,3-dimethyl-1,3-butadiene, and 1,3-pentadiene; and the like. The content of the styrene unit in the styrene polymer block is preferably 80 wt % or more, more preferably 90 wt % or more, and particularly preferably substantially 100 wt %.

In addition, when the pre-cross-linking styrene-based block copolymer is the styrene-isoprene block copolymer, the isoprene polymer block constituting the styrene-isoprene block copolymer may be any polymer block having an isoprene unit as a main constituent unit, and may contain a monomer unit other than the isoprene unit. Examples of such a monomer other than the isoprene unit include styrene; alkyl-substituted styrenes such as α-methylstyrene, o-methylstyrene, methylstyrene, p-methylstyrene, 2,4-dimethylstyrene, ethylstyrene, and p-tert-butylstyrene; halogen-substituted styrenes such as 4-chlorostyrene, 2-bromostyrene, and 3,5-difluorostyrene; alkoxy-substituted styrenes such as 4-methoxystyrene and 3,5-dimethoxystyrene; conjugated diene monomers other than isoprene such as 1,3-butadiene, 2,3-dimethyl-1,3-butadiene, and 1,3-pentadiene; divinyl monomers such as α, ω-bis(vinylphenyl)alkane and 1,2-bis(vinylphenyl)ethane; and the like. The content of the isoprene unit in the isoprene polymer block is preferably 80 wt % or more, more preferably 90 wt % or more, and particularly preferably substantially 100 wt %.

The pre-cross-linking styrene-based block copolymer comprising the styrene-isoprene-styrene triblock copolymer (hereinafter, appropriately referred to as "latex of pre-cross-linking styrene-isoprene-styrene triblock copolymer") can be obtained by conventionally known methods. The pre-cross-linking styrene-isoprene-styrene triblock copolymer can be obtained by block copolymerizing a conjugated diene and an alkenyl aromatic hydrocarbon in an inert polymerization solvent using, for example, an active organic metal such as n-butyllithium as an initiator. The obtained polymer solution of the pre-cross-linking styrene-based block copolymer may be used as it is for producing a latex of the pre-cross-linking styrene-based block copolymer. Further, after removing the solid pre-cross-linking styrene-based block copolymer from the polymer solution, the removed solid pre-cross-linking styrene-based block copolymer may be dissolved into an organic solvent to be used for producing the latex of the pre-cross-linking styrene-based block copolymer. A method for producing the latex of the pre-cross-linking styrene-based block copolymer is not particularly limited. As the method for producing the latex of the pre-cross-linking styrene-based block copolymer, a method comprising emulsifying a solution of the pre-cross-linking styrene-based block copolymer dissolved in an organic solvent or a fine suspension of the pre-cross-linking styrene-based block copolymer finely dispersed in an organic solvent in the presence of a surfactant in water to produce a latex of the pre-cross-linking styrene-based block copolymer is preferred. In this method, the organic solvent is removed as required.

At this time, impurities such as residues of the polymerization catalyst left in the polymer solution after synthesis may be removed. Further, an antioxidant described below may be added to the liquid during or after the polymerization. A commercially available solid pre-cross-linking styrene-based block copolymer can also be used.

The pre-cross-linking styrene-based block copolymer may be obtained by a conventionally known method. For example, a conjugated diene and an alkenyl aromatic hydrocarbon are block copolymerized in an inert polymerization solvent using an active organic metal such as n-butyllithium as an initiator to obtain a diblock copolymer having an active end of the alkenyl aromatic hydrocarbon—the conjugated diene. Thereafter, the obtained diblock copolymer may be subjected to a coupling reaction using a coupling agent to obtain the pre-cross-linking styrene-based block copolymer.

The coupling agent is not particularly limited, and any coupling agent having two or more functional groups can be used. Examples of a coupling agent having two functional groups include silane halides having two functional groups such as dichlorosilane, monomethyldichlorosilane, and dimethyldichlorosilane; alkoxysilanes having two functional groups such as diphenyldimethoxysilane and diphenyldiethoxysilane; alkane halides having two functional groups such as dichloroethane, dibromoethane, methylene chloride, and dibromomethane; tin halides having two functional groups such as dichlorotin, monomethyldichlorotin, dimethyldichlorotin, monoethyldichlorotin, diethyldichlorotin, monobutyldichlorotin, and dibutyldichlorotin; dibromobenzene, benzoic acid, CO, 2-chloropropene, and the like. Examples of a coupling agent having three functional groups include alkane halides having three functional groups such as trichloroethane and trichloropropane; silane halides having three functional groups such as methyltrichlorosilane and ethyltrichlorosilane; alkoxysilanes having three functional groups such as methyltrimethoxysilane, phenyltrimethoxysilane, and phenyltriethoxysilane; and the like. Examples of a coupling agent having four functional groups include alkane halides having four functional groups such as carbon tetrachloride, carbon tetrabromide, and tetrachloroethane; silane halides having four functional groups such as tetrachlorosilane and tetrabromosilane; alkoxysilanes having four functional groups such as tetramethoxysilane and tetraethoxysilane; tin halides having four functional groups such as tetrachlorotin and tetrabromotin; and the like. Examples of a coupling agent having five functional groups include 1,1,1,2,2-pentachloroethane, perchloroethane, pentachlorobenzene, perchlorobenzene, octabromodiphenyl ether, decabromodiphenyl ether, and the like. These coupling agents may be used one type alone or in combination of two or more types.

By using the coupling agent having three or more functional groups as the coupling agent, the obtained pre-cross-linking styrene-based block copolymer can be a copolymer having a multi-branched structure in which n is two or more in the general formula (1). Since a copolymer having such a multi-branched structure performs a cross-linking reaction described later, it usually contains little (e.g., about 10 wt % or less) gel content (toluene insoluble content).

In addition, when a coupling reaction with a coupling agent is pertained, the coupling reaction may be pertained in the presence of a polymerization terminator. Thus, the obtained pre-cross-linking styrene-based block copolymer can contain a predetermined amount of an uncoupled diblock copolymer. The polymerization terminator is not particularly limited, and examples thereof include alcohols such as methanol, ethanol, propanol, butanol, isopropanol, and the like.

Examples of the organic solvent used in the polymerization reaction and the coupling reaction include aromatic hydrocarbon solvents such as benzene, toluene, and xylene; alicyclic hydrocarbon solvents such as cyclopentane, cyclopentene, cyclohexane, and cyclohexene; aliphatic hydrocarbon solvents such as pentane, hexane, and heptane; halogenated hydrocarbon solvents such as methylene chloride, chloroform, and ethylene dichloride; and the like. Among these, aromatic hydrocarbon solvents and alicyclic hydrocarbon solvents are preferable, and pentane, hexane, cyclohexane, and toluene are particularly preferable.

The amount of the organic solvent to be used is usually 50 to 2,000 parts by weight, preferably 80 to 1,000 parts by weight, more preferably 10 to 500 parts by weight, and still more preferably 150 to 300 parts by weight, with respect to 100 parts by weight of the pre-cross-linking styrene-based block copolymer.

As the surfactant used for emulsifying the polymer solution, anionic surfactants can be suitably used. Examples of the anionic surfactant include fatty acid salts such as sodium laurate, potassium myristate, sodium palmitate, potassium oleate, sodium linolenate, and sodium rosinate; alkylbenzene sulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinates such as sodium di(2-ethylhexyl) sulfosuccinate, potassium di(2-ethylhexyl) sulfosuccinate, and sodium dioctyl sulfosuccinate; alkyl sulfate ester salts such as sodium lauryl sulfate and potassium lauryl sulfate; polyoxyethylene alkyl ether sulfate ester salts such as sodium polyoxyethylene lauryl ether sulfate and potassium polyoxyethylene lauryl ether sulfate; monoalkyl phosphates such as sodium lauryl phosphate and potassium lauryl phosphate; and the like.

Among these anionic surfactants, fatty acid salts, alkylbenzene sulfonates, alkyl sulfosuccinates, alkyl sulfate ester salts, and polyoxyethylene alkyl ether sulfate ester salts are preferable, fatty acid salts and alkylbenzene sulfonates are more preferable, and sodium rosinate and sodium dodecylbenzene sulfonate are particularly preferable.

The above-described use of at least one selected from the group consisting of alkylbenzene sulfonates, alkyl sulfosuccinates, alkyl sulfate ester salts, and polyoxyethylene alkyl ether sulfate ester salts in combination with a fatty acid salt results in a latex containing the at least one selected from alkylbenzene sulfonates, alkyl sulfosuccinates, alkyl sulfate ester salts, and polyoxyethylene alkyl ether sulfate ester salts, and the fatty acid salt.

Further, a surfactant other than anionic surfactants may be used in combination, and examples of the surfactant other than anionic surfactants include copolymerizable surfactants such as sulfoesters of α,β-unsaturated carboxylic acids, sulfate esters of α,β-unsaturated carboxylic acids, and sulfoalkyl aryl ethers.

Further, nonionic surfactants such as polyoxyethylene alkyl ethers, polyoxyethylene alkyl phenol ethers, polyoxyethylene alkyl esters, and polyoxyethylene sorbitan alkyl esters may be used in combination as long as they do not inhibit coagulation by a coagulant used in obtaining the molded film such as dip-molding.

The amount of the surfactant to be used is preferably from 0.1 to 50 parts by weight, more preferably from 0.5 to 30 parts by weight, with respect to 100 parts by weight of the pre-cross-linking styrene-based block copolymer. When the amount of the surfactant used is too small, the latex tends to be less stable. On the contrary, when the amount of the surfactant used is too large, it tends to be foamed, and there is a possibility that a problem occurs during dip molding.

The amount of water to be used in obtaining the latex of the pre-cross-linking styrene-based block copolymer is preferably from 10 to 1,000 parts by weight, more preferably from 30 to 500 parts by weight, and particularly preferably from 50 to 100 parts by weight, with respect to 100 parts by weight of the organic solvent solution of the pre-cross-linking styrene-based block copolymer. Examples of the type of water to be used include hard water, soft water, deionized water, distilled water, and zeolite water, and the like. Among these, soft water, ion-exchanged water and distilled water are preferred.

A device for emulsifying the organic solvent solution or fine suspension of the pre-cross-linking styrene-based block copolymer in water in the presence of a surfactant is not particularly limited and can be used as long as it is commercially available as an emulsifier or a disperser. There is no particular limitation on a method for adding a surfactant to the organic solvent solution or fine suspension of the pre-cross-linking styrene-based block copolymer. The method for adding a surfactant includes adding the surfactant in advance to either of water, or the organic solvent solution or fine suspension of the pre-cross-linking styrene-based block copolymer or both of water and the organic solvent or fine suspension. A surfactant may be added to a emulsified liquid while an emulsification operation is performed. Further, a surfactant may be added collectively or may be added in a divided manner.

Examples of the emulsifying apparatus include batch emulsifying machines such as "Homogenizer" (product name, manufactured by IKA), "POLYTRON" (product name, manufactured by Kinematica AG), and "TK AUTO-HOMO MIXER" (product name, manufactured by Tokushu Kika Kogyo Co., Ltd.); continuous emulsifying machines such as "TK PIPELINE-HOMO MIXER" (product name, manufactured by Tokushu Kika Kogyo Co., Ltd.), "Colloid mill" (product name, manufactured by Shinko Pantec Co., Ltd.), "SLASHER" (product name, manufactured by NIPPON COKE & ENGINEERING CO., LTD.), "Trigonal wet grinder" (product name, manufactured by Mitsui Miike Chemical Engineering Machinery, Co., Ltd.), "CAVITRON" (product name, manufactured by Eurotec, Ltd.), "MILDER" (product name, manufactured by Pacific Machinery & Engineering Co., Ltd.), and "FINE FLOW MILL" (product name, manufactured by Pacific Machinery & Engineering Co., Ltd.); high-pressure emulsifying machines such as "Microfluidizer" (product name, manufactured by MIZUHO INDUSTRIAL CO., LTD.), "NANOMIZER" (product name, manufactured by NANOMIZER Inc.), and "APV GAULIN" (product name, manufactured by Manton-Gaulin Company); membrane emulsifying machines such as "Membrane emulsifier" (product name, manufactured by REICA Co., Ltd.); vibratory emulsifying machines such as "VIBRO MIXER" (product name, manufactured by REICA Co., Ltd.); ultrasonic emulsifying machines such as "Ultrasonic homogenizer" (product name, manufactured by Branson Ultrasonics Corporation); and the like. The conditions for the emulsification process using such an emulsifying apparatus are not specifically limited, and the treatment temperature, the treatment time, and the like may be appropriately determined to ensure a desired dispersion state.

In producing a latex of the pre-cross-linking styrene-based block copolymer, it is preferable to remove the organic solvent from the emulsion obtained through the emulsification operation to obtain the latex of the pre-cross-linking styrene-based block copolymer. The method for removing the organic solvent from the emulsion is preferably a method in which the content of the organic solvent (preferably an alicyclic hydrocarbon solvent) can be 500 ppm by weight or less in the obtained latex of the pre-cross-linking styrene-based block copolymer. As the method for removing the organic solvent from the emulsion, for example, a method such as vacuum distillation, atmospheric distillation, steam distillation, centrifugation, and the like can be employed.

Then, with respect to the latex of the pre-cross-linking styrene-based block copolymer thus obtained, a toluene insoluble component is famed by cross-linking of the pre-cross-linking styrene-based block copolymer in the state of latex. As a result, it is possible to obtain a latex of the styrene-based block copolymer according to the present invention comprising a styrene-based block copolymer and water, the styrene-based block copolymer having a toluene insoluble content of 30 to 95 wt %.

For example, when a latex of a block copolymer represented by the general formula (1) of A-B—Y—(B-A)$_n$ described above is used as the latex of the pre-cross-linking styrene-based block copolymer, by performing the cross-linking, a latex of a styrene-based block copolymer comprising a styrene-based block copolymer and water, the styrene-based block copolymer having the toluene insoluble content of 30 to 95 wt % and being represented by the general formula (1) of A-B—Y—(B-A)$_n$ described above can be obtained.

In addition, when a latex of a styrene-isoprene block copolymer is used as the latex of the pre-cross-linking styrene-based block copolymer, a latex of a styrene-based block copolymer comprising a styrene-isoprene block copolymer and water, the styrene-isoprene block copolymer having the toluene insoluble content of 30 to 95 wt % can be obtained by performing the cross-linking.

In the cross-linking reaction, a known polymerization initiator can be used. However, from the viewpoint that a molded film such as a dip-molded product having excellent long-tam stability can be suitably obtained, a radical polymerization initiator is preferably used.

The radical polymerization initiators are not specifically limited, and examples thereof include inorganic peroxides such as sodium persulfate, potassium persulfate, ammonium persulfate, potassium superphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyryl peroxide, and benzoyl peroxide; azo compounds such as azobisisobutyronitrile, azobis-2,4-dimethylvaleronitrile, and methyl azobisisobutyrate; and the like. Among these, from the viewpoint that tensile strength, tear strength and stress retention of the obtained molded film such as the dip-molded product can be further increased, a peroxide polymerization initiator comprising an inorganic peroxide and an organic peroxide is preferred, and an organic peroxide is more preferred, and a 1,1,3,3-tetramethylbutyl hydroperoxide is particularly preferred.

In addition, when a peroxide polymerization initiator is used as the radical polymerization initiator, an activator may be used in combination. For example, a reducing agent can be used as the activator and is combined with the reducing agent to make a redox-type polymerization initiator. The reducing agent is not particularly limited. Examples of the reducing agent include compounds containing a metal ion in a reduced state such as ferrous sulfate and copper naphthenate; sulfonic acid compounds such as sodium methanesulfonate and sodium formaldehyde sulfoxylate; amine compounds such as dimethylaniline; and the like. One of these reducing agents can be used alone, or two or more of them can be used in combination. The amount of the reducing agent to be used is preferably from 0.01 to 10 parts by weight, more preferably from 0.1 to 1 parts by weight, and particularly preferably from 0.4 to 1 parts by weight, with respect to 100 parts by weight of the peroxide polymerization initiator.

When a reducing agent is used as the activator, a chelating agent may be further used from the viewpoint of enhancing dispersibility of the reducing agent. The chelating agent is not particularly limited. Examples of the chelating agent include sodium salts of ethylenediaminetetraacetic acid such as a disodium salt of ethylenediaminetetraacetic acid (EDTA·2H·2Na), a trisodium salt of ethylenediaminetetraacetic acid (EDTA·H·3 Na), a tetrasodium salt of ethylenediaminetetraacetic acid (EDTA·4Na), and the like. Sodium salt of ethylenediaminetetraacetic acid is usually added as a hydrate.

With respect to the latex of the pre-cross-linking styrene-based block copolymer, a cross-linking temperature for performing cross-linking in the state of a latex is not particularly limited. The cross-linking temperature is preferably from 10 to 60° C., more preferably from 30 to 50° C. Further, cross-linking time is not particularly limited, but is preferably 10 minutes to 5 hours, and more preferably 30 minutes to 1 hour.

Thus, the latex of the styrene-based block copolymer according to the present invention can be obtained by cross-linking the pre-cross-linking styrene-based block copolymer in the latex of the pre-cross-linking styrene-based block copolymer in the state of latex. The latex of the styrene-based block copolymer according to the present invention comprises a styrene-based block copolymer and water, the styrene-based block copolymer having a toluene insoluble content of 30 to 95 wt %. The latex of the styrene-based block copolymer according to the present invention can be suitably obtained by cross-linking the pre-cross-linking styrene-based block copolymer in the latex of the pre-cross-linking styrene-based block copolymer in the state of latex, but is not particularly limited to those obtained by such a method.

The toluene insoluble content of the styrene-based block copolymer constituting the latex of the styrene-based block copolymer according to the present invention is from 30 to 95 wt %, preferably from 50 to 95 wt %, more preferably from 70 to 95 wt %. According to the present invention, the toluene insoluble content of the styrene-based block copolymer in the latex of the styrene-based block copolymer ranges from 30 to 95 wt %. This allows to provide the latex of the styrene-based block copolymer that is superior in processability and can provide a molded film such as a dip-molded product having the high tear strength, the high stress retention and the soft texture. When the toluene insoluble content is too small, the obtained molded film such as the dip-molded product becomes inferior to the tear strength. On the other hand, when the toluene insoluble content is too large, the moldability of the styrene-based block copolymer as a latex is diminished, and the obtained molded film such as the dip-molded product becomes inferior in uniformity of film thickness. In order to prevent the toluene insoluble content from being excessively high, a carboxyl group of the styrene-based block copolymer constituting the latex of the styrene-based block copolymer according to the present invention is preferably 0.3 wt % or less, more preferably 0.05 wt % or less, and particularly preferably substantially free, with respect to the styrene-based block copolymer.

In the present invention, the toluene insoluble content is a weight percentage of an insoluble content of the styrene-based block copolymer (solid content) contained in the latex of the styrene-based block copolymer after being immersed in toluene and allowed to stand for 24 hours at 25° C., with respect to an amount of the styrene-based block copolymer prior to immersing in toluene.

The method for adjusting the toluene insoluble content of the styrene-based block copolymer constituting the latex of the styrene-based block copolymer to the above range is not particularly limited. The method for adjusting the toluene insoluble content within the above range includes a method for controlling a type of a radical polymerization initiator, the use amount of the radical polymerization initiator, a type of an activator and the use amount thereof, a cross-linking temperature and cross-linking time, and the like that are used when cross-linking the pre-cross-linking styrene-based block copolymer in the state of latex.

A solid content concentration of the latex of the styrene-based block copolymer according to the present invention is not particularly limited. The solid content concentration is preferably from 10 to 75 wt %, more preferably from 30 to 70 wt %, and still more preferably from 50 to 65 wt %. When the solid content concentration is too low, film thickness of the obtained molded film such as the dip-molded product may be thinned and easily toil. On the other hand, when the solid content concentration is too high, the viscosity of the latex of the styrene-based block copolymer becomes high, which may make it difficult to transfer the latex in piping or stirring the latex in a blending tank.

A method for adjusting the solid content concentration of the latex of the styrene-based block copolymer according to the present invention is not particularly limited. The method for adjusting the solid content concentration of the latex includes a method for performing a concentration operation on the latex of the pre-cross-linking styrene-based block copolymer prior to performing a cross-linking reaction or the latex of the styrene-based block copolymer after the cross-linking reaction by a method such as vacuum distillation, atmospheric distillation, centrifugation, and membrane concentration, and the like. Among these, centrifugation is preferably performed from the viewpoint that the residual amount of surfactant in the latex of the styrene-based block copolymer according to the present invention can be reduced.

The centrifugation is preferably performed, for example, using a continuous centrifuge under conditions that centrifugal force is preferably 100 to 10,000 G; a solid content concentration of the latex prior to the centrifugation is preferably 2 to 15 wt %; a flow rate to be fed into the centrifuge is preferably from 500 to 1700 Kg/hr; and a back pressure (a gauge pressure) of the centrifuge is preferably from 0.03 to 1.6 Mpa. As a light liquid after centrifugation, the latex of the styrene-based block copolymer can be obtained.

In the latex of the styrene-based block copolymer according to the present invention, when the solid content concentration is adjusted to 55 wt %, the viscosity at a temperature of 25° C. is preferably 10 to 300 cps, more preferably 10 to 200 cps, and still more preferably 100 to 200 cps. When the solid content concentration is adjusted to 55 wt %, the viscosity at a temperature of 25° C. can be measured using a B-type viscometer with adjusting the solid content concentration of the latex of the styrene-based block copolymer to 55 wt %. A method for adjusting the solid content concentration of the latex of the styrene-based block copolymer to 55 wt % is not particularly limited. As the method for adjusting the solid content concentration to 55 wt %, when the solid content concentration is higher than 55 wt %, water may be added to adjust the solid content concentration. When the solid content concentration is lower than 55 wt %, the concentration operation may be performed by a method such as vacuum distillation, atmospheric distillation, centrifugation, membrane concentration, and the like. Provided that the solid content concentration is adjusted to 55 wt %, when the viscosity at a temperature of 25° C. is too low, film thickness of the obtained molded film such as the dip-molded product becomes too thin, and sufficient mechanical properties may not be obtained. On the other hand, when the viscosity at a temperature of 25° C. is too high, the handling property of the latex of the styrene-based block copolymer may be deteriorated.

In view of obtaining a molded film such as a dip-molded product excellent in tear strength, stress retention, and texture, it is preferable that the latex of the styrene-based block copolymer according to the present invention is a latex of a styrene-based block copolymer obtained by using a latex of a pre-cross-linking styrene-based block copolymer as a latex of a pre-cross-linking styrene-based block copolymer.

In addition, when the latex of the styrene-based block copolymer according to the present invention is a latex of a styrene-isoprene block copolymer, a styrene polymer block in the styrene-based block copolymer constituting the latex of the styrene-isoprene block copolymer may be any polymer block having a styrene unit as a main constituent unit, and may contain a monomer unit other than the styrene unit. Examples of such a monomer other than the styrene include those described above, and the amount of the styrene unit in the styrene polymer block is preferably within the range above. In addition, an isoprene polymer block in the styrene-isoprene block copolymer constituting the latex of the styrene-isoprene block copolymer according to the present invention may be any polymer block having an isoprene unit as a main constituent unit, and may contain a monomer unit other than the isoprene unit. Examples of such a monomer other than the isoprene include those described above, and the amount of the isoprene unit in the isoprene polymer block is preferably within the range above. The isoprene unit constituting the isoprene polymer block may be one in which a part of unsaturated bonds is hydrogenated by a hydrogenation reaction.

In addition, when the latex of the styrene-based block copolymer according to the present invention is a latex of a styrene-isoprene block copolymer, a content ratio of the styrene unit and the isoprene unit in the styrene-isoprene block copolymer constituting the latex of the styrene-isoprene block copolymer is usually in the range of 1:99 to 90:10, preferably 3:97 to 70:30, more preferably 5:95 to 50:50, and still more preferably 10:90 to 30:70, in terms of a weight ratio of "styrene unit:isoprene unit".

A volume-average particle diameter of the latex of the styrene-based block copolymer according to the present invention is preferably 0.1 to 10 µm, more preferably 0.5 to 3 µm, and still more preferably 0.5 to 2.0 µm.

In the latex of the styrene-based block copolymer according to the present invention, additives such as a pH adjusting agent, an antifoaming agent, an antiseptic, a cross-linking agent, a chelating agent, an oxygen scavenger, a dispersant, and an antioxidant, which are usually blended in the field of latex, may be blended into the latex to form a latex composition.

Examples of the cross-linking agent include sulfur such as powder sulfur, flowers of sulfur, precipitated sulfur, colloid sulfur, surface-treated sulfur, and insoluble sulfur; sulfur-containing compounds such as sulfur chloride, sulfur dichloride, morpholine disulfide, alkyl phenol disulfides, caprolactam disulfide (N,N'-dithio-bis(hexahydro-2H-azepinone-2)), phosphorus-containing polysulfides, polymer polysulfides, and 2-(4'-morpholinodithio)benzothiazole; and the like.

Examples of the cross-linking accelerator include dithiocarbamic acids, such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthiocarbaylthio)benzothiazole, 2-(2,6-dimethyl-4-morpholinothio)benzothiazole, 2-(4'-morpholinodithio)benzothiazole, 4-morpholinyl-2-benzothiazyl disulfide, 1,3-bis(2-benzothiazylmercaptomethyl)urea, and the like.

Examples of the pH adjusting agent include alkaline metal hydroxides such as sodium hydroxide and potassium hydroxide; carbonates of alkaline metal such as sodium carbonate and potassium carbonate; hydrogen carbonates of alkaline metal such as sodium hydrogen carbonate; ammonia; organic amine compounds such as trimethyl amine and triethanolamine; and the like.

Examples of the antioxidant include phenolic antioxidants containing no sulfur atoms such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenated phenol, 2,2'-methylene-bis(6-α-methyl-benzyl-p-cresol), 4,4'-methylenebis(2,6-di-t-butylphenol), 2,2'-methylene-bis(4-methyl-6-t-butylphenol), alkylated bisphenols, and a butylated reaction product of p-cresol with dicyclopentadiene; thiobisphenol antioxidants such as 2,2'-thiobis-(4-methyl-6-t-butylphenol), 4,4'-thiobis-(6-t-butyl-o-cresol), and 2,6-di-t-butyl-4-(4,6-bis(octylthio)-1,3,5-triazin-2-ylamino)phenol; phosphite ester antioxidants such as tris(nonylphenyl) phosphite, diphenylisodecyl phosphite, and tetraphenyl dipropylene glycol diphosphite; sulfur ester antioxidants such as dilauryl thiodipropionate; amine antioxidants such as phenyl-α-naphthylamine, phenyl-β-naphthylamine, p-(p-toluenesulfonylamide)-diphenylamine, 4,4'-(α,α-dimethylbenzyl)diphenylamine, N,N-diphenyl-p-phenylenediamine, N-isopropyl-N'-phenyl-p-phenylenediamine, and butyl aldehyde-aniline condensate; quinoline antioxidants such as 6-ethoxy-2,2,4-trimethyl-1,2-dihydroquinoline; hydroquinone antioxidants such as 2,5-di-(t-amyl)hydroquinone; and the like.

<Molded Film>

The molded film according to the present invention is a molded product in the form of a film made of the latex of the styrene-based block copolymer according to the present invention. The film thickness of the molded film according to the present invention is preferably 0.03 to 0.50 mm, more preferably 0.05 to 0.40 mm, particularly preferably 0.08 to 0.30 mm.

The molded film according to the present invention, although not specifically limited, is suitably a dip-molded product obtained by dip-molding the latex of the styrene-based block copolymer according to the present invention. The dip-molding is a method comprising: immersing a mold in the latex of the styrene-based block copolymer to deposit the latex of the styrene-based block copolymer on the surface of the mold; pulling the mold out of the latex of the styrene-based block copolymer; and drying the latex of the styrene-based block copolymer deposited on the surface of the mold. The mold before the immersion in the latex of the styrene-based block copolymer may be preheated. Further, before the mold is immersed in the latex of the styrene-based block copolymer or after the mold is pulled out of the latex of the styrene-based block copolymer, a coagulant can be used as required.

Specific examples of methods for using the coagulant include a method of attaching the coagulant to the mold by immersing the mold in a coagulant solution before the immersion in the latex of the styrene-based block copolymer (anode coagulant dipping), and a method of immersing a mold on which the latex of the styrene-based block copolymer has been deposited in a coagulant solution (Teague coagulant dipping), and the like. The anode coagulant dipping is preferable in that a dip-molded product having less unevenness in thickness is obtained.

Specific examples of the coagulant include water-soluble polyvalent metal salts including metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate. Among these, calcium salts are preferable, and calcium nitrate is more preferable. One of these water-soluble polyvalent metal salts can be used alone, or two or more of them can be used in combination.

The coagulant is preferably used in the form of an aqueous solution. The aqueous solution may further contain a water-soluble organic solvent such as methanol or ethanol, and a nonionic surfactant. Although the concentration of the coagulant varies depending on the type of the water-soluble polyvalent metal salts, the concentration is preferably 5 to 50 wt %, more preferably 10 to 30 wt %.

The mold is pulled up from the latex of the styrene-based block copolymer. Thereafter, usually, a deposit famed on the mold is heated and dried to obtain a dip-molded product. The drying conditions may be appropriately selected.

After drying, the deposit famed on the mold may be cross-linked, if necessary. Since the latex of the styrene-based block copolymer according to the present invention contains the toluene insoluble content of 30 to 95 wt %, sufficient mechanical properties can be realized without performing such a cross-linking operation.

A heating condition at the time of cross-linking is not particularly limited. A heating temperature is preferably from 60 to 150° C., more preferably from 100 to 130° C. A heating time is preferably from 10 to 120 minutes.

A method for heating is not particularly limited. Examples of the method include a method for heating in a warm air in an oven, a method for heating by irradiating infrared rays, and the like.

In addition, it is preferable to wash the mold with water or warm water in order to remove water-soluble impurities (e.g., a surplus surfactant and coagulant) before or after heating the mold on which the latex of the styrene-based block copolymer is deposited. A temperature of the warm water used is preferably from 40° C. to 80° C., more preferably from 50° C. to 70° C.

The dip-molded product thus obtained is removed from the mold. Specific examples of the method for removing include a method for peeling from the mold by hand, a method for peeling off by water pressure or compressed air pressure, and the like.

A molded film according to the present invention and a dip-molded product as one aspect thereof are obtained by using the latex of the styrene-based block copolymer according to the present invention above, and therefore is excellent in the uniformity of film thickness due to the excellent moldability of the latex. Furthermore, the molded film according to the present invention and the dip-molded product as one aspect thereof have the high tear strength, the high stress retention, and the soft texture. The molded film according to the present invention and the dip-molded product as one aspect thereof can be particularly suitably used, for example, as a glove. When the molded film is a glove, in order to prevent adhesion of contact surfaces between the molded films and to improve slip during detachment, inorganic fine particles such as talc and calcium carbonate or organic fine particles such as starch particles may be scattered on a glove surface; an elastomeric layer containing microparticles may be formed on the glove surface; or a surface layer of the glove may be chlorinated.

Further, other than the glove, the molded film according to the present invention and the dip-molded product as an embodiment thereof can be used as medical supplies such as baby bottle nipples, droppers, tubes, water pillows, balloon stalls, catheters, and condoms; toys such as balloons, dolls, and balls; industrial supplies such as pressure molding bags and gas storage bags; fingerstalls; and the like.

<Packaging Structure>

A packaging structure according to the present invention is the one capable of accommodating an object between a first sheet substrate and a second sheet substrate, wherein at least a part of the first sheet substrate and at least a part of the second sheet substrate are bonded and laminated by a film comprising the latex of a the styrene-based block copolymer of the present invention. Specifically, in the packaging structure according to the present invention, the first sheet substrate and the second sheet substrate are arranged so that surfaces to which the latex of the styrene-based block copolymer according to the present invention is applied (latex coated surfaces) face each other with sandwiching the object as needed. Then, the first sheet substrate and the second sheet substrate are adhered to each other by pressing the latex coated surfaces of the first sheet substrate and the second sheet substrate in contact with each other. As a result, the structure capable of packaging the object is obtained. The object is not particularly limited. Examples of the object include various objects that are desired to be sterilized, such as a medical product, for example, an adhesive plaster. The first sheet substrate and the second sheet substrate are not particularly limited. Examples of the first sheet substrate and the second sheet substrate include a paper material such as a glassine paper, a high-density polyethylene nonwoven fabric, a polyolefin film, a polyester film, and the like. Among these, a paper material is preferred in terms of excellent handleability (appropriately foldable) and economic efficiency, and a glassine paper is particularly preferred.

<Adhesive Composition>

In the present invention, the latex of the styrene-based block copolymer according to the present invention can be used as an adhesive composition.

The content (solids content) of the latex of the styrene-based block copolymer according to the present invention in the adhesive composition is preferably 5 to 60 wt %, more preferably 10 to 30 wt %.

The adhesive composition preferably contains an adhesive resin in addition to the latex of the styrene-based block copolymer according to the present invention. Although the adhesive resin is not specifically limited, a resorcinol-formaldehyde resin, a melamine resin, an epoxy resin, and an isocyanate resin can be suitably used, for example. Among these, a resorcinol-formaldehyde resin is preferable. A known resorcinol-formaldehyde resin (such as those disclosed in JPS 55-142635 A) can be used. The reaction ratio of resorcinol to formaldehyde is generally 1:1 to 1:5, preferably 1:1 to 1:3 in terms of the molar ratio of "resorcinol: formaldehyde".

For further enhancing the adhesion of the adhesive composition, the adhesive composition can contain 2,6-bis(2,4-dihydroxyphenylmethyl)-4-chlorophenol or a similar compound, an isocyanate, a blocked isocyanate, ethylene urea, polyepoxide, modified polyvinyl chloride resin, and the like, which are conventionally used.

Further, the adhesive composition can contain a vulcanization aid. Containing a vulcanization aid can improve the mechanical strength of the later-described composite to be obtained using the adhesive composition. Examples of the vulcanization aid can include quinone dioximes such as p-quinone dioxime; methacrylic acid esters such as lauryl methacrylate and methyl methacrylate; allyl compounds such as DAF (diallyl fumarate), DAP (diallyl phthalate), TAC (triallyl cyanurate), and TAIC (triallyl isocyanurate); maleimide compounds such as bismaleimide, phenylmaleimide, and N,N-m-phenylenedimaleimide; sulfur; and the like.

<Substrate with Adhesive Layer>

The substrate with an adhesive layer according to the present invention is obtained by forming an adhesive layer using the latex of the styrene-based block copolymer or the adhesive composition according to the present invention on a surface of a substrate.

Although the substrate is not specifically limited, a fiber substrate can be used, for example. The type of fibers constituting the fiber substrate is not specifically limited, and examples thereof include vinylon fibers, polyester fibers, polyamide fibers such as nylon and aramid (aromatic polyamide) fibers, glass fibers, cotton, rayon, and the like. These can be appropriately selected according to the application. The shape of the fiber substrate is not specifically limited, and examples thereof can include shapes of staples, filaments, cords, ropes, woven fabrics (such as canvas), and the like, which can be appropriately selected according to the application. For example, the substrate with an adhesive layer can be used as a substrate-rubber composite by adhering to a rubber via the adhesive layer. Although the substrate-rubber composite is not specifically limited, examples thereof include a toothed rubber belt with a core using a fiber substrate in the form of a cord, a toothed rubber belt using a fiber substrate in the form of a base fabric such as a canvas, and the like.

Although any method for obtaining the substrate-rubber composite can be used without limitation, examples thereof include a method of applying the latex of the styrene-based block copolymer or the adhesive composition according to the present invention to the substrate, for example, by immersion and the like to obtain the substrate with an adhesive layer and placing the substrate with an adhesive layer on a rubber, followed by heating and pressurization. The pressurization can be performed using a compression (press) molding machine, a metal roll, an injection molding machine, or the like. The pressure for the pressurization is preferably 0.5 to 20 MPa, more preferably 2 to 10 MPa. The heating temperature is preferably 130 to 300° C., more preferably 150 to 250° C. The heating and pressurization time is preferably 1 to 180 minutes, more preferably 5 to 120 minutes. The heating and pressurization method enables the molding of the rubber and the adhesion between the substrate with an adhesive layer and the rubber to be performed simultaneously. A mold for imparting a desired surface shape to the rubber of the substrate-rubber composite is preferably famed on the inner surface of the mold of the compressor or the surface of the roll used for the pressurization.

Further, one aspect of the substrate-rubber composite can include a substrate-rubber-substrate composite. The substrate-rubber-substrate composite can be famed, for example, by combining a substrate (which may be a composite of two or more substrates) with the substrate-rubber composite. Specifically, a core serving as a substrate, a rubber, and a base fabric serving as a substrate are layered (at this time, the adhesive composition has been appropriately applied to the core and the base fabric to form substrates with an adhesive layer), followed by pressurization under heating, so that a substrate-rubber-substrate composite can be obtained.

The substrate-rubber composite obtained using the substrate with an adhesive layer according to the present invention is excellent in mechanical strength, abrasion resistance, and water resistance, and therefore can be suitably used as a belt such as a flat belt, a V belt, a V-ribbed belt, a round belt, a square belt, and a toothed belt. Further, the substrate-rubber composite obtained by using the substrate with an adhesive layer according to the present invention is excellent in oil resistance and can be suitably used as various belts such as an in-oil belt, hoses, tubes, diaphragms, and the like. Examples of the hoses include single-tube rubber hoses, multilayer rubber hoses, braided reinforced hoses, fabric-wrapped reinforced hoses, and the like. Examples of the diaphragms include flat diaphragms, rolling diaphragms, and the like.

The substrate-rubber composite obtained using the substrate with an adhesive layer according to the present invention can also be used as industrial products such as seals and rubber rolls in addition to the above applications. Examples of the seals include seals for moving parts such as rotating, swinging, and reciprocating parts and seals for fixed parts. Examples of the seals for moving parts include oil seals, piston seals, mechanical seals, boots, dust covers, diaphragms, accumulators, and the like. Examples of the seals for fixed parts include o-rings, various gaskets, and the like. Examples of the rubber rolls include rolls that are parts of OA equipment such as printers and copiers; fiber processing rolls such as stretching rolls for spinning and draft rolls for spinning; steel rolls such as bridle rolls, snubber rolls, and steering rolls; and the like.

EXAMPLES

Hereinafter, the present invention will be specifically described with reference to the Examples. However, the present invention is not limited to these examples. The "part(s)" below is based on weight unless otherwise specified. Various physical properties were measured as follows.
<Solids Content>
2 g of each sample was accurately weighed (weight: X2) into an aluminum dish (weight: X1), followed by drying in a hot air dryer at 105° C. for 2 hours. Subsequently, after cooling in a desiccator, the weight thereof including the aluminum dish was measured (weight: X3) to calculate the solids content according to the following calculation formula.

$$\text{Solids content (wt \%)} = (X3 - X1) \times 100 / X2$$

<Toluene Insoluble Content>
15 g of a latex was placed in a petri dish made of polytetrafluoroethylene and air-dried at 25° C. for 2 days. Thereafter, it was vacuum-dried at 40° C. for 24 hours. 300 mg of the obtained rubber was precisely weighed and placed in a cage made of 100 mesh stainless steel wire gauze. The rubber-laden cage was immersed in 100 ml of toluene and allowed to stand for 24 hours at 25° C. Then, the immersed cage was pulled up from toluene and air dried. Thereafter, the whole cage was vacuum-dried overnight at 60° C. After drying, the insoluble content remaining in the cage was precisely weighed, and the ratio (wt %) to the rubber weight prior to immersion in toluene was calculated. Accordingly, a toluene insoluble content was obtained.
<Viscosity at a Solid Concentration of 55 wt % and a Temperature of 25° C.>
The solid content concentration of the latex was adjusted to 55 wt %. Then, viscosity measurement was performed by using a B-type viscometer type BH (available from TOKYO KEIKI INC.) at a temperature of 25° C. Specifically, 200 mL of the latex was placed in a 300 mL glass beaker. Any one of rotors No. 1 to No. 6 was then immersed to the line imprinted on the rotor. Then, at a temperature of 25° C., the viscosity measurement was performed.
<Dip Moldability>
Dip moldability was evaluated by measuring film thickness of the obtained dip-molded product. The film thickness was measured at random five points for the dip-molded product. When variation of the film thickness was within 5% of a mean thickness (i.e., all of the values of film thickness from five points are ±5% of the values obtained by averaging the film thickness of the five points), the dip formability was determined as "good". When variation of the film thickness was greater than 5% and less than or equal to 10% of the mean thickness (i.e., at least one of the values of the film thickness at the five points is more than ±5% and less than or equal to ±10% of the value obtained by averaging the film thickness at the five points, and no value of more than ±10% of the averaged value is observed), the dip formability was determined as "fair". When variation of the film thickness was greater than 10% of the mean thickness (i.e., at least one of the values of the film thickness at the five points is more than ±10% of the value obtained by averaging the film thickness at the five points), the dip formability was determined as "poor".

<Tensile Strength and Elongation of Dip-Molded Product>

According to ASTM D412, the dip-molded product was punched with a dumbbell (product name "Superdumbbell (type: SDMK-100C)", available from DUMBBELL CO., LTD.) to prepare a test piece for measuring tensile strength. The test piece was pulled at a tensile speed of 500 mm/min by using a Tensilon universal tester (product name "RTG-1210", available from ORIENTEC CORPORATION). Tensile strength immediately before the failure (unit: MPa) and elongation at the failure (unit: %) were measured.

<Tear Strength of Dip-Molded Product>

In accordance with ASTM D624-00, a dip-molded product was allowed to stand still in a constant-temperature and constant-humidity room at 23° C. and a relative humidity of 50% for 24 hours or more, and then was punched out using a dumbbell (product name "Die C", manufactured by DUMBBELL CO., LTD.) to prepare a test piece for tear strength measurement. The test piece was stretched at a stretching speed of 500 mm/min using a TENSILON Universal Material Testing Instrument (product name "RTG-1210", available from A&D Company, Limited) to measure the tear strength (unit: N/mm).

<Stress Retention>

A tensile stress immediately after pulling the dip-molded product to an elongation ratio of 100% and a tensile stress after holding at an elongation ratio of 100% for 6 minutes were measured by using a Tensilon universal tester (product name "RTG-1210", available from A&D Co., Ltd.). Then, the stress retention (unit: %) was determined by calculating (the tensile stress after holding for 6 minutes at an elongation ratio of 100%/the tensile stress immediately after the elongation ratio became 100%×100). The higher the stress retention is, the less likely deterioration (looseness or slack) associated with use will occur when used as a glove, which is preferable.

<500% Tensile Stress of Dip-Molded Product>

According to ASTM D412, the dip-molded product was punched with a dumbbell (product name "Superdumbbell (type: SDMK-100C)", available from DUMBBELL CO., LTD.) to prepare a test piece for measuring tensile stress. The test piece was pulled at a tensile speed of 500 mm/min by using a Tensilon universal tester (product name "RTG-1210", available from ORIENTEC CORPORATION). Then, tensile stress (units: MPa) was measured when the elongation ratio was 500%. It is determined that the lower the 500% tensile stress is, the more soft texture the dip-molded product has.

Example 1

(Preparation of Latex of Styrene-Isoprene-Styrene Triblock Copolymer)

400 parts of a cyclohexane solution of a pre-cross-linking styrene-isoprene-styrene triblock copolymer (product name "QUINTAC 3620", available from Zeon Corporation, the content of styrene units being 14 wt %, the content of the styrene-isoprene diblock copolymer being 12 wt %, a mixture of a linear polymer and a radial polymer, containing styrene-isoprene-styrene triblock copolymer as a main component) was prepared. The cyclohexane solution comprises 100 parts of the pre-cross-linking styrene-isoprene-styrene triblock copolymer and 300 parts of cyclohexane. Further, 400 parts of an aqueous solution of a surfactant containing 0.8 parts of sodium dodecylbenzenesulfonate was prepared.

Then, the total amount of the cyclohexane solution of the above pre-cross-linking styrene-isoprene-styrene triblock copolymer and the total amount of the above aqueous solution of the surfactant were placed in a container made of SUB304 and stirred and mixed. Subsequently, an emulsification treatment was performed by a homogenizer (product name "MILDER MDN-303V", available from Pacific Machinery & Engineering Co., Ltd.) to obtain an emulsion.

Thereafter, the emulsion was transferred to a tank for removing a solvent. Cyclohexane was distilled off from the emulsion in the tank for removing a solvent, and a solid content concentration of the emulsion was adjusted to 10 wt %. Then, aggregates contained in the emulsion were removed by using a 200 mesh stainless steel wire gauze. As a result, a latex of a pre-cross-linking styrene-isoprene-styrene triblock copolymer was obtained.

Then, by using an another container, a solution comprising 2 parts of distilled water, 0.3 parts of sodium formaldehyde sulfoxylate (product name "SFS", available from MITSUBISHI GAS CHEMICAL COMPANY, INC., a reducing agent), and 0.08 parts of ferrous sulfate (product name "Chelest Fe", available from CHELEST CORPORATION, a reducing agent) were prepared. Then, the total amount of the solution prepared above was added to the latex of the pre-cross-linking styrene-isoprene-styrene triblock copolymer with respect to 100 parts of the pre-cross-linking styrene-isoprene-styrene triblock copolymer in the latex. Thereafter, 0.5 parts of 1,1,3,3-tetramethylbutyl hydroperoxide (product name "PEROCTA H", available from NOF CORPORATION, an organic peroxide-based radical polymerization initiator) was added, and the reaction was carried out under an inert gas atmosphere at 50° C. for 1 hour. Thus, a cross-linking reaction of the pre-cross-linking styrene-isoprene-styrene triblock copolymer was performed.

Rotor MN was then set in a cooled centrifuge (type "H-2000B", available from Kokusan Co., Ltd.), and the latex after cross-linking was transferred to a centrifuge tube having a volume of 500 ml equipped with the cooled centrifuge. A centrifugal separation operation was carried out for 20 minutes under the conditions of a set temperature of 20° C., and a rotation speed of 4,000 G. After the centrifugal separation operation stopped, a light liquid was immediately scraped out from the inside of the centrifuge tube. This light liquid was obtained as a latex of a styrene-isoprene-styrene triblock copolymer (A-1). A solid content concentration of the obtained latex of the styrene-isoprene-styrene triblock copolymer (A-1) was 65 wt %. Then, a toluene insoluble content and viscosity at a solid content concentration of 55 wt % and a temperature of 25° C. were measured for the obtained latex of the styrene-isoprene-styrene triblock copolymer (A-1). The results are shown in Table 1. The styrene-isoprene-styrene triblock copolymer constituting the obtained latex of the styrene-isoprene-styrene triblock copolymer (A-1) was substantially free of carboxyl groups. The same applies to Examples 2 to 4 described later.

(Production of Dip-Molded Product)

154 parts of the latex of the styrene-isoprene-styrene triblock copolymer (A-1) obtained above (100 parts in terms of the styrene-isoprene-styrene triblock copolymer) was adjusted with an aqueous solution of potassium hydroxide so that the latex has a pH of 10 while stirring.

Apart from the latex, a commercially available ceramic hand mold (manufactured by SHINKO CERAMICS CO., LTD.) was washed, followed by preheating in an oven at 70° C. Thereafter, the hand mold was immersed in a coagulant aqueous solution containing 18 wt % of calcium nitrate and 0.05 wt % of polyoxyethylene lauryl ether (product name "EMULGEN 109P", manufactured by Kao Corporation) for 5 seconds, and was taken out of the coagulant aqueous solution. Subsequently, the hand mold was dried in an oven at 70° C. for 30 minutes or more, thereby allowing the coagulant to adhere to the hand mold, so that the hand mold was coated with the coagulant.

Thereafter, the hand mold coated with the coagulant was taken out of the oven and was immersed for 10 seconds in the latex obtained above. Subsequently, the hand mold was air-dried at room temperature for 10 minutes and was immersed in hot water at 60° C. for 5 minutes to elute water-soluble impurities, thereby forming a dip-molded layer on the hand mold. Thereafter, the dip-molded layer famed on the hand mold was dried by heating in an oven under the conditions of a temperature of 110° C. for 20 minutes, followed by cooling to room temperature, and was separated from the hand mold after spreading talc to obtain a dip-molded product (rubber glove). Then, the obtained dip-molded product (rubber glove) was evaluated for the dip-moldability, the tensile strength, the elongation, the tear strength, the stress retention, and the 500% tensile stress according to the above methods. The results are shown in Table 1.

Example 2

When carrying out the cross-linking reaction of the pre-cross-linking styrene-isoprene-styrene triblock copolymer, the amount of sodium formaldehyde sulfoxylate (SFS) used was changed to 0.2 parts, the amount of ferrous sulfate used was changed to 0.05 parts, and the amount of 1,1,3,3-tetramethylbutyl hydroperoxide used was changed to 0.3 parts, respectively. Except for this, a latex of a styrene-isoprene-styrene triblock copolymer (A-2) was obtained in the same manner as in Example 1, and evaluation of the latex (A-2) was performed in the same manner as in Example 1. The results are shown in Table 1.

Then, a dip-molded product (a rubber glove) was obtained in the same manner as in Example 1, except that the latex of the styrene-isoprene-styrene triblock copolymer (A-2) obtained above was used. Evaluation of the dip-molded product was performed in the same manner. The results are shown in Table 1.

Example 3

When carrying out the cross-linking reaction of the pre-cross-linking styrene-isoprene-styrene triblock copolymer, the amount of sodium formaldehyde sulfoxylate (SFS) used was changed to 0.1 parts, the amount of ferrous sulfate used was changed to 0.02 parts, and the amount of 1,1,3,3-tetramethylbutyl hydroperoxide used was changed to 0.1 parts, respectively. Except for this, a latex of a styrene-isoprene-styrene triblock copolymer (A-3) was obtained in the same manner as in Example 1, and evaluation of the latex (A-3) was performed in the same manner as in Example 1. The results are shown in Table 1.

Then, a dip-molded product (a rubber glove) was obtained in the same manner as in Example 1, except that the latex of the styrene-isoprene-styrene triblock copolymer (A-3) obtained above was used. Evaluation of the dip-molded product was performed in the same manner. The results are shown in Table 1.

Example 4

When carrying out the cross-linking reaction of the pre-cross-linking styrene-isoprene-styrene triblock copolymer, sodium formaldehyde sulfoxylate (SFS), ferrous sulfate, and 1,1,3,3-tetramethylbutyl hydroperoxide were not used. In place of them, 1 part of azobisisobutyronitrile (AIBN, an azo compound-based radical polymerization initiator) was used. Except for this, a latex of a styrene-isoprene-styrene triblock copolymer (A-4) was obtained in the same manner as in Example 1, and evaluation of the latex (A-4) was performed in the same manner as in Example 1. The results are shown in Table 1.

Then, a dip-molded product (a rubber glove) was obtained in the same manner as in Example 1, except that the latex of the styrene-isoprene-styrene triblock copolymer (A-4) obtained above was used. Evaluation of the dip-molded product was performed in the same manner. The results are shown in Table 1.

Comparative Example 1

When carrying out the cross-linking reaction of the pre-cross-linking styrene-isoprene-styrene triblock copolymer, 5 parts of methacrylic acid was used in addition. Except for this, a latex of a styrene-isoprene-styrene triblock copolymer (A-5) was obtained in the same manner as in Example 2, and evaluation of the latex (A-5) was performed in the same manner as in Example 1. The results are shown in Table 1.

Then, a dip-molded product (a rubber glove) was obtained in the same manner as in Example 1, except that the latex of the styrene-isoprene-styrene triblock copolymer (A-5) obtained above was used. Evaluation of the dip-molded product was performed in the same manner. The results are shown in Table 1.

Comparative Example 2

When carrying out the cross-linking reaction of the pre-cross-linking styrene-isoprene-styrene triblock copolymer, the reaction temperature was changed to 30° C. Except for this, a latex of a styrene-isoprene-styrene triblock copolymer (A-6) was obtained in the same manner as in Example 3, and evaluation of the latex (A-6) was performed in the same manner as in Example 1. The results are shown in Table 1.

Then, a dip-molded product (a rubber glove) was obtained in the same manner as in Example 1, except that the latex of the styrene-isoprene-styrene triblock copolymer (A-6) obtained above was used. Evaluation of the dip-molded product was performed in the same manner. The results are shown in Table 1.

Comparative Example 3

Synthetic polyisoprene (product name "IR2200L", available from Zeon Corporation) was used in place of the pre-cross-linking styrene-isoprene-styrene triblock copolymer (product name "QUINTAC 3620", available from Zeon Corporation). In addition, as a surfactant, sodium dodecylbenzene sulfonate was substituted for sodium rosinate/sodium dodecylbenzene sulfonate=2/1 (weight ratio). Except for this, a latex of synthetic polyisoprene (A-7) was obtained in the same manner as in Example 1, and evaluation of the latex (A-7) was performed in the same manner as in Example 1. The results are shown in Table 1.

Then, a dip-molded product (a rubber glove) was obtained in the same manner as in Example 1, except that the latex of synthetic polyisoprene (A-7) obtained above was used. Evaluation of the dip-molded product was performed in the same manner. The results are shown in Table 1.

On the other hand, when methacrylic acid was used in cross-linking the pre-cross-linking styrene-isoprene block copolymer, a grafting reaction of methacrylic acid occurred together with a cross-linking reaction. As a result, a latex having the toluene insoluble content of more than 95 wt % was obtained, resulting in a latex inferior in moldability (Comparative Example 1).

When a latex of a styrene-isoprene block copolymer containing a styrene-isoprene block copolymer having the toluene insoluble content of less than 30 wt % was used, the tear strength of the obtained dip-molded product was inferior (Comparative Example 2).

Furthermore, when a latex containing synthetic isoprene having the toluene insoluble content ranging from 30 to 95

TABLE 1

| | | Cross-linking reaction | | | | | | | |
|---|---|---|---|---|---|---|---|---|---|
| | | Radical polymerization initiator | | Reducing agent | | Reducing agent | | Carboxyl group-containing monomer | |
| | Type of polymer | Type | Amount of use (part) | Type | Amount of use (part) | Type | Amount of use (part) | Type | Amount of use (part) |
| Example 1 | Styrene-isoprene-styren triblock copolymer | Organic peroxide | 0.5 | SFS | 0.3 | Ferrous sulfate | 0.08 | — | — |
| Example 2 | Styrene-isoprene-styrene triblock copolymer | Organic peroxide | 0.3 | SFS | 0.2 | Ferrous sulfate | 0.05 | — | — |
| Example 3 | Styrene-isoprene-styrene triblock copolymer | Organic peroxide | 0.1 | SFS | 0.1 | Ferrous sulfate | 0.02 | — | — |
| Example 4 | Styrene-isoprene-styrene triblock copolymer | Azo compound | 1 | — | — | — | — | — | — |
| Comparative Example 1 | Styrene-isoprene-styrene triblock copolymer | Organic peroxide | 0.3 | SFS | 0.2 | Ferrous sulfate | 0.05 | Methacrylic acid | 5 |
| Comparative Example 2 | Styrene-isoprene-styrene triblock copolymer | Organic peroxide | 0.1 | SFS | 0.1 | Ferrous sulfate | 0.02 | — | — |
| Comparative Example 3 | Synthetic polyisoprene | Organic peroxide | 0.1 | SFS | 0.2 | Ferrous sulfate | 0.05 | — | — |

| | Latex characterization | | | Evaluation of dip-molded product | | | | |
|---|---|---|---|---|---|---|---|---|
| | Toluene insoluble content (wt %) | Viscosity at 55 wt % of solid content (cps) | Processability | Tensile strength (MPa) | Elongation (%) | Tear strength (N/m) | Stress retention (%) | 500% tensile stress (MPa) |
| Example 1 | 92 | 152 | good | 32 | 1010 | 36 | 88 | 2.1 |
| Example 2 | 81 | 161 | good | 30 | 1110 | 34 | 86 | 1.4 |
| Example 3 | 35 | 161 | good | 25 | 1180 | 29 | 82 | 1.2 |
| Example 4 | 78 | 155 | good | 27 | 1140 | 30 | 80 | 1.4 |
| Comparative Example 1 | 100 | 456 | poor | 29 | 1100 | 32 | 87 | 2.8 |
| Comparative Example 2 | 24 | 161 | good | 24 | 1200 | 25 | 81 | 1.1 |
| Comparative Example 3 | 75 | 183 | good | 11 | 1320 | 13 | 80 | 1.2 |

As shown in Table 1, the latex of the styrene-isoprene block copolymer comprising the styrene-isoprene block copolymer and water, the styrene-isoprene block copolymer having the toluene insoluble content of 30 to 95 wt % is superior in processability. Further, the dip-molded product obtained by using this latex has the high tear strength and stress retention and has the soft texture (i.e., the 500% tensile stress being low) (Examples 1 to 4).

wt % was used in place of the styrene-isoprene block copolymer, the tensile strength and tear strength of the obtained dip-molded product were inferior (Comparative Example 3).

The invention claimed is:
1. A latex of a styrene-based block copolymer comprising a styrene-based block copolymer and water, the styrene-based block copolymer comprising a toluene insoluble con- tent of 30 to 95 wt %, wherein the viscosity at 25° C. is 10 to 300 cps when a solid content concentration is set to 55 wt %.

2. The latex of the styrene-based block copolymer according to claim 1, wherein the styrene-based block copolymer is a styrene-based block copolymer represented by the following general formula (1),

$$A\text{-}B\text{—}Y\text{—}(B\text{-}A)_n \qquad (1)$$

in the general formula (1), each of A is independently a polymer block containing 90 wt % or more of a unit derived from an alkenyl aromatic hydrocarbon; Y is a single bond or a residue of a coupling agent having functionality; each of B is independently a polymer block containing 90 wt % or more of a unit derived from a conjugated diene; and "n" is 0 to 5.

3. The latex of the styrene-based block copolymer according to claim 1, wherein the styrene-based block copolymer is a styrene-isoprene block copolymer.

4. A molded film comprising the latex of the styrene-based block copolymer according to claim 1.

5. A packaging structure capable of accommodating an object between a first sheet substrate and a second sheet substrate, wherein at least a part of the first sheet substrate and at least a part of the second sheet substrate are bonded and laminated by a film comprising the latex of the styrene-based block copolymer according to claim 1.

6. A substrate with an adhesive layer, the adhesive layer being formed on a surface of the substrate, the adhesive layer comprising the latex of the styrene-based block copolymer according to claim 1.

7. A method for producing the latex of the styrene-based block copolymer according to claim 1, comprising:
    adding a radical polymerization initiator to a latex of a styrene-based block copolymer prior to cross-linking as a raw material; and
    cross-linking the styrene-based block copolymer prior to cross-linking as a raw material in the form of the latex to form a toluene insoluble component.

8. The method for producing the latex of the styrene-based block copolymer according to claim 7, wherein the radical polymerization initiator is a peroxide polymerization initiator.

9. The method for producing the latex of the styrene-based block copolymer according to claim 7, comprising:
    adding an activator in addition to the radical polymerization initiator to proceed the cross-linking reaction.

10. A method for producing a dip-molded product, comprising:
    obtaining the latex of the styrene-based block copolymer by the method according to claim 7; and
    dip-molding the obtained latex of a styrene-based block copolymer.

* * * * *